United States Patent
Kuznicki, Jr.

(10) Patent No.: US 9,642,485 B2
(45) Date of Patent: May 9, 2017

(54) BEVERAGE HOLDER

(71) Applicant: Benjamin J. Kuznicki, Jr., Jupiter, FL (US)

(72) Inventor: Benjamin J. Kuznicki, Jr., Jupiter, FL (US)

(*) Notice: Subject to any disclaimer, the term of this patent is extended or adjusted under 35 U.S.C. 154(b) by 0 days.

(21) Appl. No.: 15/158,835

(22) Filed: May 19, 2016

(65) Prior Publication Data

US 2016/0338516 A1 Nov. 24, 2016

Related U.S. Application Data

(60) Provisional application No. 62/163,688, filed on May 19, 2015.

(51) Int. Cl.
| | |
|---|---|
| *F16L 3/08* | (2006.01) |
| *A47G 23/02* | (2006.01) |
| *F16B 1/00* | (2006.01) |
| *F16M 11/14* | (2006.01) |
| *F16M 13/02* | (2006.01) |

(52) U.S. Cl.
CPC ............ *A47G 23/0225* (2013.01); *F16B 1/00* (2013.01); *F16M 11/14* (2013.01); *F16B 2001/0028* (2013.01); *F16M 13/022* (2013.01)

(58) Field of Classification Search
USPC .................................................... 248/226.11
See application file for complete search history.

(56) References Cited

U.S. PATENT DOCUMENTS

| | | | | | |
|---|---|---|---|---|---|
| 4,570,835 | A | * | 2/1986 | Criqui | B62J 11/00 224/414 |
| 4,728,147 | A | * | 3/1988 | Dutton | A47C 7/62 248/230.8 |
| 4,799,638 | A | * | 1/1989 | Allen | A47C 7/62 248/231.81 |
| 5,014,956 | A | * | 5/1991 | Kayali | B60N 3/102 248/311.2 |
| 5,056,696 | A | * | 10/1991 | Lahr | A45F 5/02 224/148.4 |
| 5,199,678 | A |  | 4/1993 | Luebke | |
| 5,566,917 | A | * | 10/1996 | Wu | A47K 5/00 248/311.2 |
| 5,597,148 | A | * | 1/1997 | Gospodarich | A47C 7/68 248/230.5 |
| 5,605,312 | A |  | 2/1997 | Elder et al. | |
| 5,628,485 | A |  | 5/1997 | Ray | |
| 5,695,162 | A | * | 12/1997 | DiCastro | A47G 23/0225 248/231.81 |
| 5,865,412 | A | * | 2/1999 | Mason | A47C 7/62 248/214 |

(Continued)

*Primary Examiner* — Monica Millner
(74) *Attorney, Agent, or Firm* — Diederiks & Whitelaw, PLC

(57) ABSTRACT

A beverage holder includes a cup configured to receive and support a beverage and an arm directly coupled to the cup. The arm includes a first vertical wall and a second vertical wall. The first and second vertical walls define a slot configured to receive an arm of a chair. The beverage holder also includes a strap having a first end fixed to the arm and a second end removably coupled to the arm. A leveling mechanism is configured to allow the cup to be tilted relative to the arm and selectively fixed in place such that a user can vertically align the cup.

20 Claims, 6 Drawing Sheets

(56) References Cited

U.S. PATENT DOCUMENTS

| | | | | |
|---|---|---|---|---|
| 5,967,345 A * | 10/1999 | Subotin | A47C 7/62 | 211/119.007 |
| 5,996,957 A * | 12/1999 | Kurtz | A47G 23/0225 | 248/231.21 |
| 6,010,104 A * | 1/2000 | Hanson | A47C 1/16 | 248/309.1 |
| 6,019,335 A * | 2/2000 | Sehati | A45F 5/02 | 224/148.4 |
| 6,227,510 B1 * | 5/2001 | McMullen, Sr. | A47C 7/68 | 248/230.5 |
| 6,227,511 B1 * | 5/2001 | De Costa | A47C 7/62 | 248/311.2 |
| D447,333 S * | 9/2001 | Phetthaweebancha | D3/215 | |
| 6,318,691 B1 * | 11/2001 | Toth, Jr. | A45D 20/12 | 248/231.41 |
| 6,390,427 B1 * | 5/2002 | McConnell | A61G 5/10 | 248/230.1 |
| 6,478,371 B1 * | 11/2002 | Clarke | A47C 7/62 | 297/188.11 |
| 6,527,240 B1 * | 3/2003 | Huang | A47G 23/0225 | 248/218.4 |
| 6,601,813 B1 * | 8/2003 | Kager | A45D 20/12 | 248/288.31 |
| 6,983,918 B1 * | 1/2006 | Leasure | A63B 27/00 | 248/274.1 |
| 8,033,518 B2 * | 10/2011 | Schuchman | A47G 23/0225 | 224/679 |
| 8,333,429 B2 | 12/2012 | Nelson et al. | | |
| 8,500,076 B2 * | 8/2013 | Lai | A47G 23/0225 | 224/148.5 |
| 8,636,319 B1 * | 1/2014 | Parker, Jr. | A47C 7/62 | 248/311.2 |
| 8,777,307 B2 * | 7/2014 | Nelson | A47C 7/70 | 297/188.14 |
| 9,027,807 B2 * | 5/2015 | Kampas | A45F 5/00 | 224/148.4 |
| 2005/0236531 A1 * | 10/2005 | Joeckel | A47G 21/145 | 248/133 |
| 2008/0128571 A1 * | 6/2008 | Dostaler | A47G 23/0225 | 248/229.13 |
| 2014/0252820 A1 * | 9/2014 | Botello | F16M 13/02 | 297/188.04 |
| 2015/0274300 A1 * | 10/2015 | Moore | B64D 11/0638 | 224/401 |

* cited by examiner

BEVERAGE HOLDER

CROSS REFERENCE TO RELATED APPLICATIONS

This application claims the benefit of U.S. Provisional Patent Application Ser. No. 62/163,688, which was filed on May 19, 2015 and titled "Beverage Holder". The entire content of this application is incorporated herein by reference.

BACKGROUND OF THE INVENTION

The present invention pertains to a beverage holder and, more particularly, to a beverage holder that can be coupled to variety of different chairs.

In certain situations, a person may find themselves seated in a chair with no convenient location to place a beverage. As a result, the person will need to set the drink on the ground or hold it in his or her hand or lap, which is considered undesirable. This problem arises most frequently in connection with outdoor chairs, such as patio chairs, lawn chairs and beach chairs. Since these chairs come in a variety of shapes and sizes, there is a need in the art for a beverage holder that can be coupled to a variety of different chairs. Furthermore, there is a need in the art for a beverage holder including a leveling feature, the leveling feature ensuring that a beverage placed in the beverage holder is vertically aligned regardless of the particular chair to which the beverage holder is coupled.

SUMMARY OF THE INVENTION

The present invention is directed to a beverage holder including a cup configured to receive and support a beverage and an arm directly coupled to the cup. The arm includes a first vertical wall and a second vertical wall. The first and second vertical walls define a slot configured to receive an arm of a chair. The beverage holder also includes a strap having a first end fixed to the arm and a second end removably coupled to the arm. A leveling mechanism is configured to allow the cup to be selectively tilted or angled relative to the arm and then fixed in place such that a user can vertically align the cup.

In a preferred embodiment, the arm further includes a bottom wall on which the cup is supported. The bottom wall slopes downward toward a center of the bottom wall, and the cup is in direct contact with the bottom wall. The bottom wall includes a hole, an outside edge and an inside edge. The outside edge is higher than the inside edge. The cup includes a shaft extending through the hole, and a diameter of the hole is greater than a diameter of the shaft such that the shaft can be located in a plurality of different locations within the hole. The shaft is threaded, and the leveling mechanism includes a threaded knob directly coupled to the shaft. The leveling mechanism also includes a plate located below the bottom wall, with the knob being in direct contact with the plate. Preferably, the diameter of the hole is in the order of 2-4 times the diameter of the shaft.

In accordance with another aspect of the invention, the arm further includes a first hole, such as elongated, slotted hole. The second end of the strap extends through the first hole, and the second end of the strap is removably coupled to itself. The arm further includes a second hole. The first end of the strap extends through the second hole, and the first end of the strap is fixed to itself. Preferably, the strap employs hook-and-loop fasteners to enable the strap to selective secure the cup to the arm of a chair.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

In addition, certain objects are described below as being coupled or directly coupled to one another. For purposes of the present invention, direct coupling is intended to encompass: 1) two objects being in direct contact with one another; and 2) two objects being in indirect contact with one another through one or more other objects specifically designed to couple the objects together. This second definition is not intended to encompass a housing, for example, that encloses a variety of different structure. Instead, the second definition is intended to recognize that objects are often coupled to one another through the use of other objects, such as brackets, whose primary purpose is to enable or facilitate coupling. Furthermore, even though certain objects are described below as being "vertical", for purposes of the present invention, this does not require that such objects are perfectly vertical but rather just upstanding, particularly when placed in an in-use position. In general, the term "vertical" is defined as including a margin of error of +/−10°.

Figure 1:
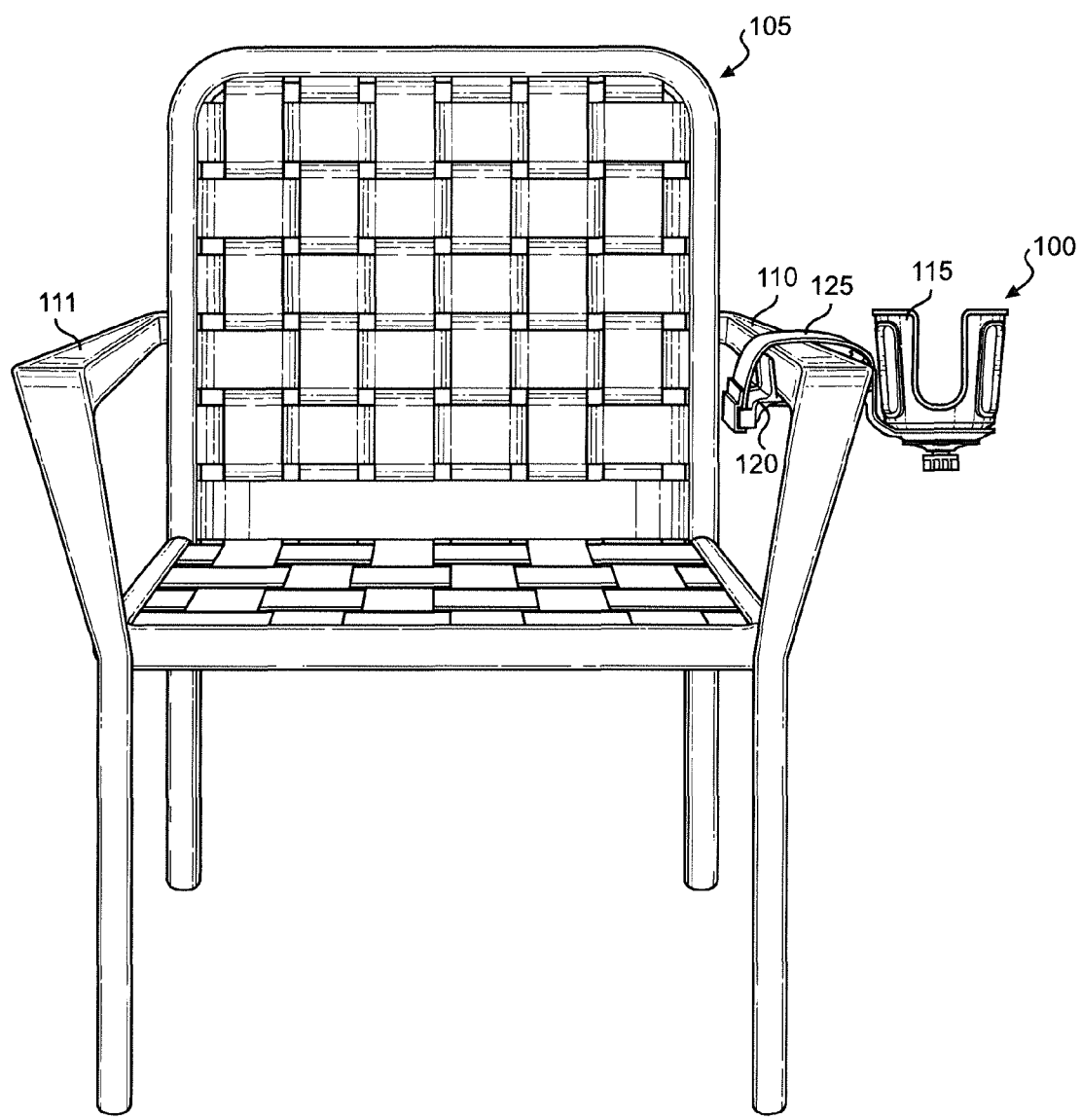
FIG. 1 is a perspective view of a beverage holder, in accordance with the present invention, coupled to a chair.

With initial reference to FIG. 1, there is shown a beverage holder 100 in accordance with the present invention. Beverage holder 100 is directly coupled to a chair 105, which is illustrated as a somewhat generic patio chair. However, beverage holder 100 can be used with other types of chairs including, without limitation, lawn chairs and beach chairs. More generally, beverage holder 100 can be used with any chair whose shape allows beverage holder 100 to be coupled thereto. Beverage holder 100 is shown directly coupled to an arm 110 of chair 105 but can also be directly coupled to (preferably integrally molded with) arm 111 of chair 105. In general, beverage holder 100 is configured to hold and support a beverage (not shown), which can be in the form of a can, bottle or mug, for example. To accomplish this, beverage holder 100 includes a cup 115 sized and shaped to receive a beverage. Beverage holder 100 also includes an arm 120 and a strap 125 for coupling beverage holder 100 to arm 110 of chair 105. Further details of this arrangement will be discussed below in connection with the other figures. However, at this point, it should be recognized that although beverage holder 100 is specifically configured for use with a beverage, beverage holder 100 can also hold and support other objects, such as a smartphone, wallet or keys.

Figure 2:
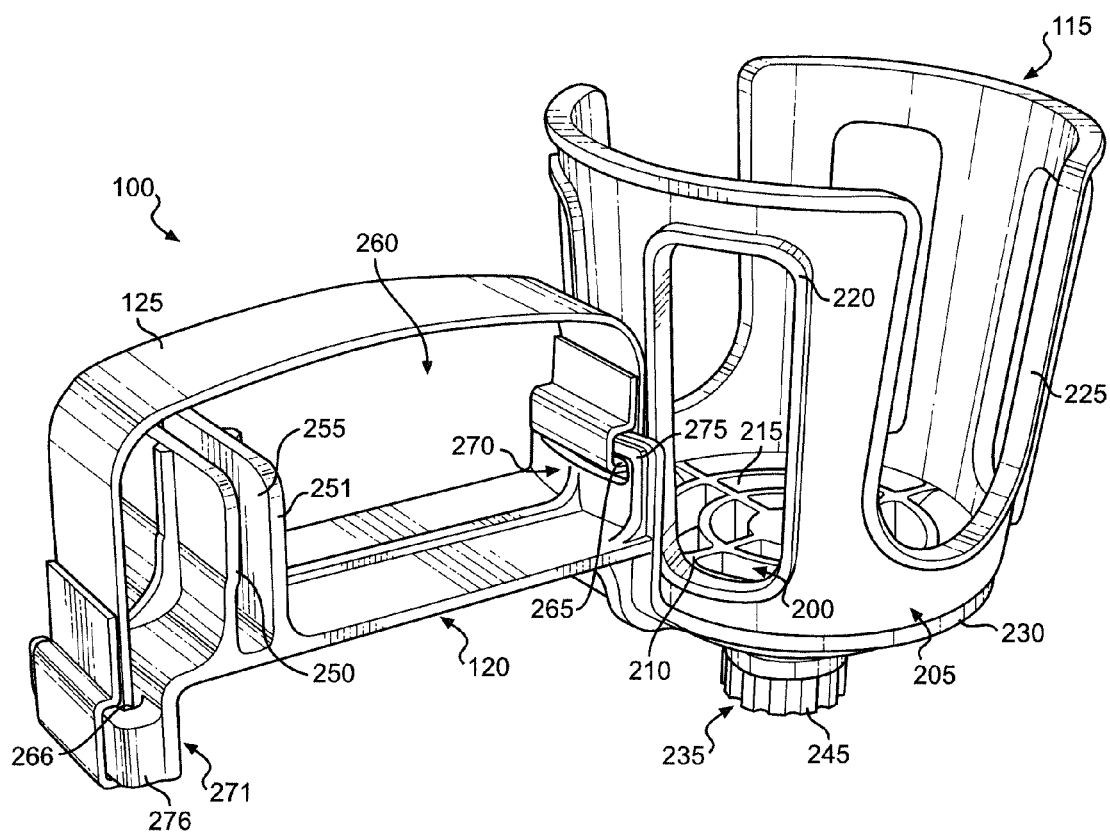
FIG. 2 is an upper perspective view of the beverage holder.
Figure 3:
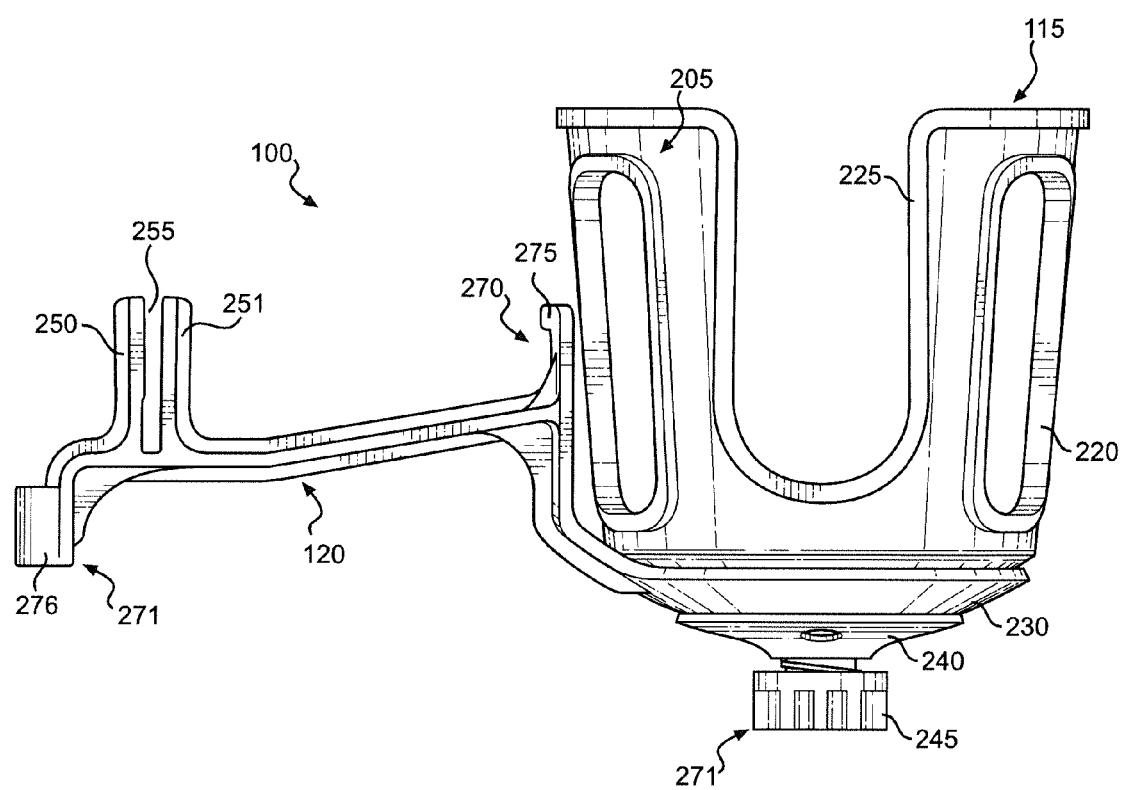
FIG. 3 is a lower perspective view of the beverage holder.

With reference now to FIGS. 2 and 3, beverage holder 100 is shown decoupled from chair 105. As discussed above, beverage holder 100 includes a cup 115 that is sized and shaped to receive a beverage. Cup 115 includes a bottom wall 200 and a side wall 205. When a beverage is placed in cup 115, the beverage is intended to be in direct contact with and supported by bottom wall 200. Depending on the size of the beverage and whether it is centered in cup 115, the beverage may also be in direct contact with side wall 205. In any case, side wall 205 prevents the beverage from tipping, sliding or otherwise falling out of beverage cup 115. Bottom wall 200 includes a plurality of spaced and interconnected ribs (one of which is labeled 210) that defines a plurality of holes (such as at 215). The beverage is to be supported on top of ribs 210, and holes 215 allow condensation or small spills from the beverage to pass through bottom wall 200, thereby ensuring that the beverage is not sitting in a pool of liquid. Side wall 205 also includes a plurality of holes (such as indicated at 220) and a plurality of U-shaped cutouts (collectively labeled 225). With this arrangement, side wall 205 has a certain degree of flexibility and the interior of cup 115 can be readily accessed. In addition, cutouts 225 specifically allow a beverage in the form of a mug to be received in cup 115. That is, if a handle of the mug is aligned with one of cutouts 225, the mug can be placed on bottom wall 200, with the handle extending through that cutout 225. Although cup 115 is illustrated as having a single side wall 205, it should be recognized that cup 115 can have multiple side walls and can be made from various materials, even more insulating materials.

An arm 120 of beverage holder 100 extends from cup 115. Proximate cup 115, arm 120 includes a bottom wall 230 on which cup 115 is supported. Cup 115 is directly and adjustably coupled to arm 120 via bottom wall 230 and a leveling mechanism 235 and includes a plate 240 and a knob 245, as will be discussed in more detail below. At an end remote from cup 115, arm 120 includes a first vertical or upstanding wall 250 and a second vertical or upstanding wall 251, which together define an interposed, vertical, U-shaped slot 255. Slot 255 is configured to receive a vertical wall of arm 110 of chair 105. This ensures that beverage holder 100 is substantially fixed in place in the direction generally parallel, i.e., laterally with respect to chair 105 to arm 120. As perhaps best shown in FIG. 2, defined along arm 120, between cup 115 and wall 251 is a chair arm receiving region 260 which is configured to receive chair arms of different shapes and sizes such that beverage holder 100 can be used with a variety of chairs. This is accomplished by leaving the space between second vertical wall 251 and cup 215 open and relatively large. As a result, a smaller chair arm might extend only part of the way from slot 255 to cup 115, while a larger chair arm could extend almost all of the way from slot 255 to cup 115 as will become more fully evident below.

With particular reference shown in FIG. 2, strap 125 is fixed to arm 120 proximate to cup 115 and removably coupled to an opposite end of arm 120. In the embodiment shown, arm 120 includes a first hole 265 which takes the form of an elongated slot formed in an upwardly extending vertical wall 270 provided at one end of arm 120 and a second hole or elongated slot 266 formed in a downwardly extending vertical wall 271 provided at an opposing end of arm 120. Strap 125 is inserted through hole 265, wrapped around a first bar 275 defining part of hole 265 and fixedly secured to itself directly adjacent cup 115, such as by sewing or gluing, for example. Alternatively, hole 265 and bar 275 can be omitted, and strap 125 can be fixed to wall 270 using rivets, bolts, screws, pins, snaps or some other type of fastener. Strap 125 is also intended to be inserted through hole 266 and wrapped around a second bar 276 but, rather than being fixed to itself, strap 125 is removably coupled to itself. Preferably, this is accomplished through the use of hook-and-loop type fasteners (not separately shown), with hooks located on one side of strap 125 and loops located on the other side of strap 125. As a result, strap 125 can be selectively coupled and decoupled at one end of arm 120 through hole 266. This allows arm 110 of chair 105 to be placed in slot 255. Specifically, strap 125 is decoupled from wall 271, if necessary, and arm 110 is inserted into slot 255. Then, strap 125 is placed across the top of chair arm 110, inserted into hole 266, pulled tight and coupled to itself, thereby securing beverage holder 100 to arm 110. The reverse takes place when beverage holder 100 is removed from chair 105. This arrangement also allows the effective length of strap 125 to be varied depending on the chair arm to which beverage holder 100 is coupled.

Figure 4:
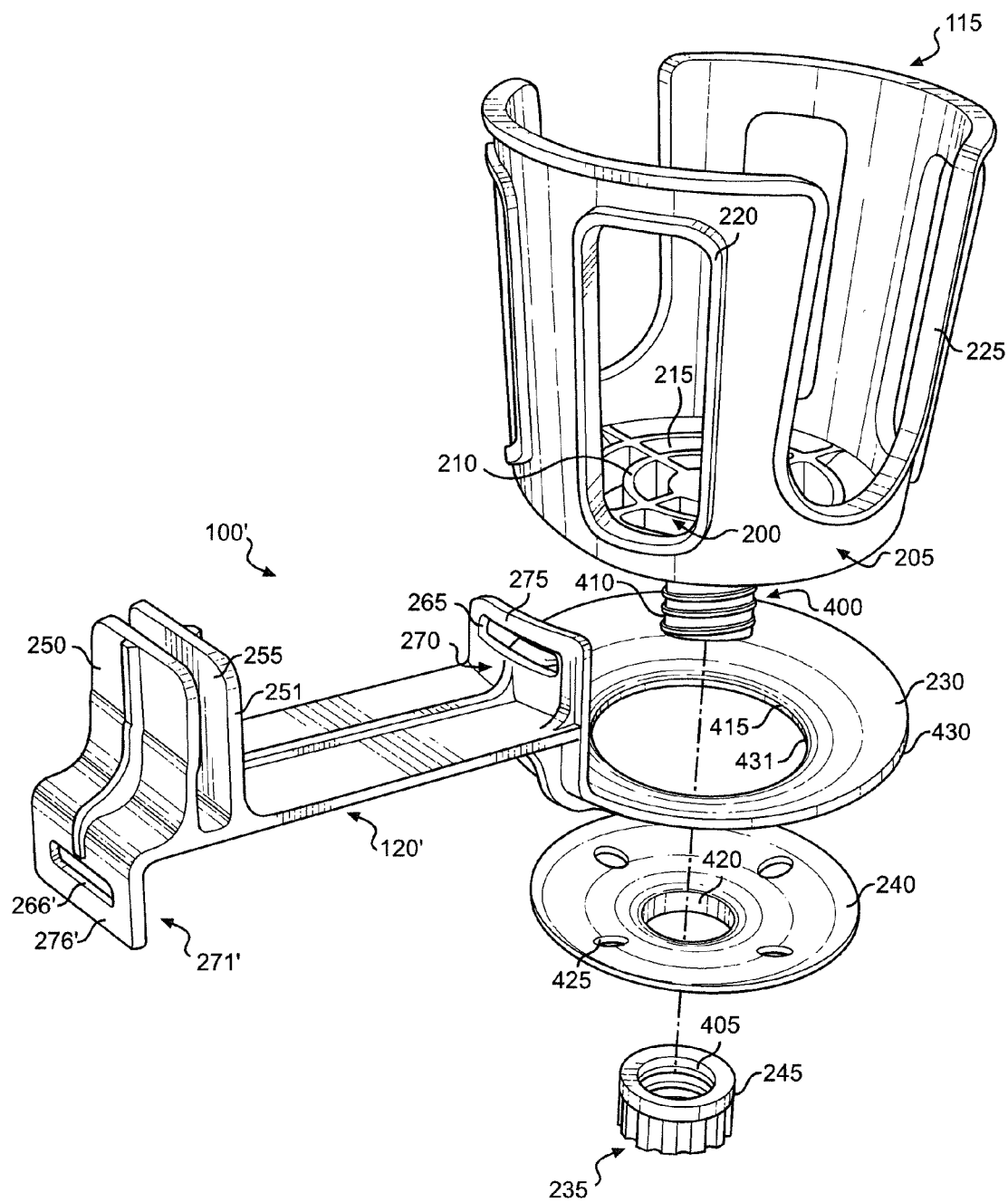
FIG. 4 is an exploded view of the beverage holder.

Turning to FIG. 4, the structure of leveling mechanism 235 is more clearly visible. Initially, however, it should be noted that, while cup 115 and leveling mechanism 235 are the same as in FIGS. 1-3, arm 120 has been replaced with an arm 120'. The only difference between arm 120 and arm 120' relates to the replacement of wall 271 with a downwardly extending vertical wall 271'. Specifically, hole 266 and bar 276 are replaced with a hole 266' and a bar 276'. Despite these changes, arms 120 and 120' function in the same manner. Accordingly, when arm 120' is coupled to arm 110 of chair 105, strap 125 is inserted into hole 266', wrapped around bar 276' and coupled to itself.

Returning to leveling mechanism 235 but with continued reference to FIG. 4, as noted above, leveling mechanism 235 includes a plate 240 and a knob 245. Leveling mechanism 235 further includes a threaded shaft 400, which is integrally formed with or directly coupled to cup 115. Knob 245 has corresponding internal threads 405 that mate with threads 410 of shaft 400. As a result, shaft 400 and knob 245 are effectively a bolt and nut, respectively. Shaft 400 extends through a hole 415 formed in bottom wall 230 and a hole 420 formed in plate 240. Although hole 420 as a diameter only slightly greater than the diameter of shaft 400, hole 415 is significantly larger. Preferably, the diameter of hole 420 is between 2-4 times the diameter of shaft 400. This allows shaft 400 to be placed in a plurality of different locations within hole 415. In order to fix shaft 400 in place relative to bottom wall 230, knob 245 is threaded onto shaft 400 and then rotated relative to shaft 400. This causes knob 245 to move upward, thereby pressing plate 240 against bottom wall 230 and pulling cup 115 against bottom wall 230. Once knob 245 is tightened, cup 115 is held in place relative to bottom wall 230 and therefore also relative to arm 120 and arm 110. The purpose of plate 240 is to enable cup 115 to be pulled into bottom wall 230 by the twisting of knob 245. Without plate 240, knob 245 would simply pass through hole 415, and cup 115 would not be held in place relative to bottom wall 230. In the embodiment shown, plate 240 includes holes (such as indicated at 425) which, at a minimum, aid in allowing liquid passing through holes 215 in bottom wall 200 of cup 115 to fall from beverage holder 100.

As illustrated, bottom wall 230 is not flat but actually slopes downward toward hole 415, i.e., an outside edge 430 of bottom wall 230 is higher than an inside edge 431 of bottom wall 230. This slope can be constant, or bottom wall 230 can be arcuate as shown. In either case, since bottom wall 230 is not flat, movement of shaft 400 within hole 415 causes cup 115 to tip relative to vertical. For example, if shaft 400 is angled to the right relative to FIG. 4, the left side of cup 115 moves down bottom wall 230 and the right side of cup 115 moves up bottom wall 230, thereby tipping cup 115 to the left. The purpose of this arrangement is to allow a user to vertically align cup 115 when the connection between beverage holder 100 and a chair arm would otherwise cause cup 115 to be angled. This can occur, for instance, when the chair arm does not extend in a horizontal plane or when the portion of the chair arm that is received in slot 255 is not a flat, vertical plane. This can also occur if chair 105 is supported on a sloped surface.

Figure 5:
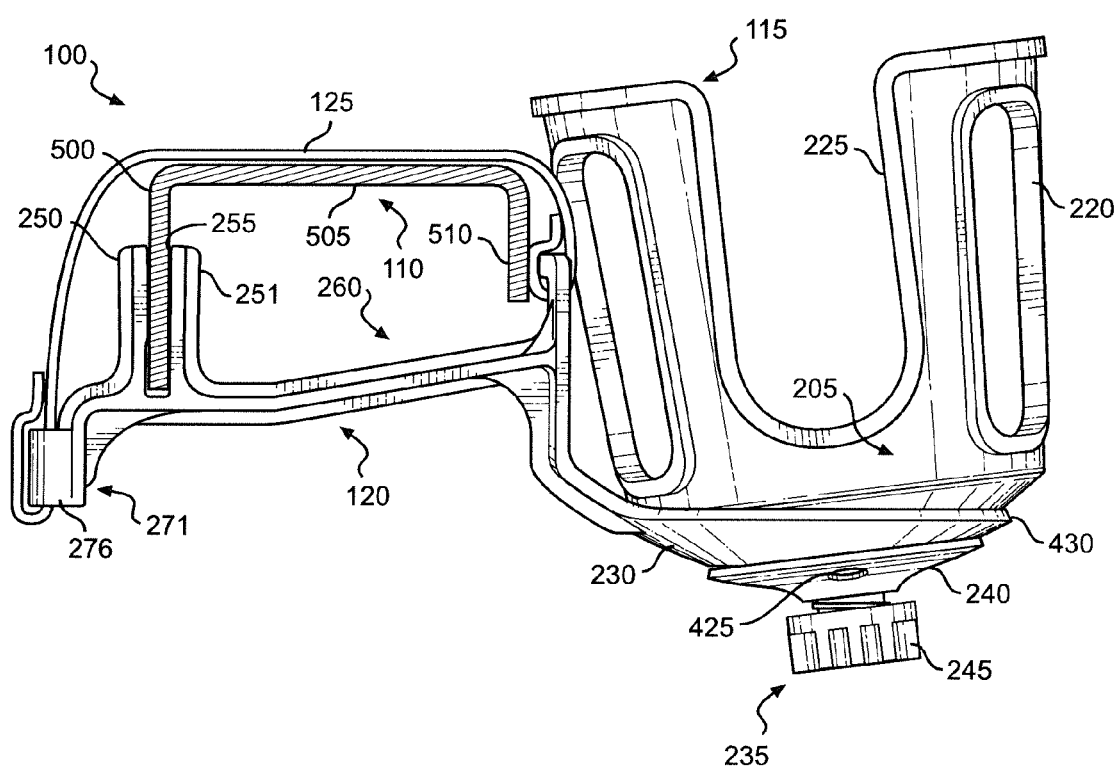
FIG. 5 is a cross section of the beverage holder and chair.

FIG. 5 shows beverage holder 100 and a cross-sectional view of a portion of arm 110, with beverage holder 100 secured to arm 110 with strap 125. In addition, note that cup 115 is tipped relative to vertical to illustrate what can be accomplished with leveling mechanism 235. However, it should be recognized that, typically, leveling mechanism 235 is used to vertically align cup 115. By "vertically aligned", it is meant that, if a line were drawn through the center of cup 115, the line would be parallel to the vector of gravity. As discussed above, when beverage holder 100 is coupled to arm 110, a first vertical wall 500 of arm 110 is received in slot 255. Arm 110 also includes a horizontal wall 505 that extends with receiving region 260 and is contacted by strap 125. Certain chairs further include a second vertical wall. This second vertical wall can be the same height as first vertical wall 500, although it is typically shorter. With respect to chair 105 in particular, arm 110 includes a second vertical wall 510 that is shorter than first vertical wall 500 and located in receiving region 260.

Figure 6:
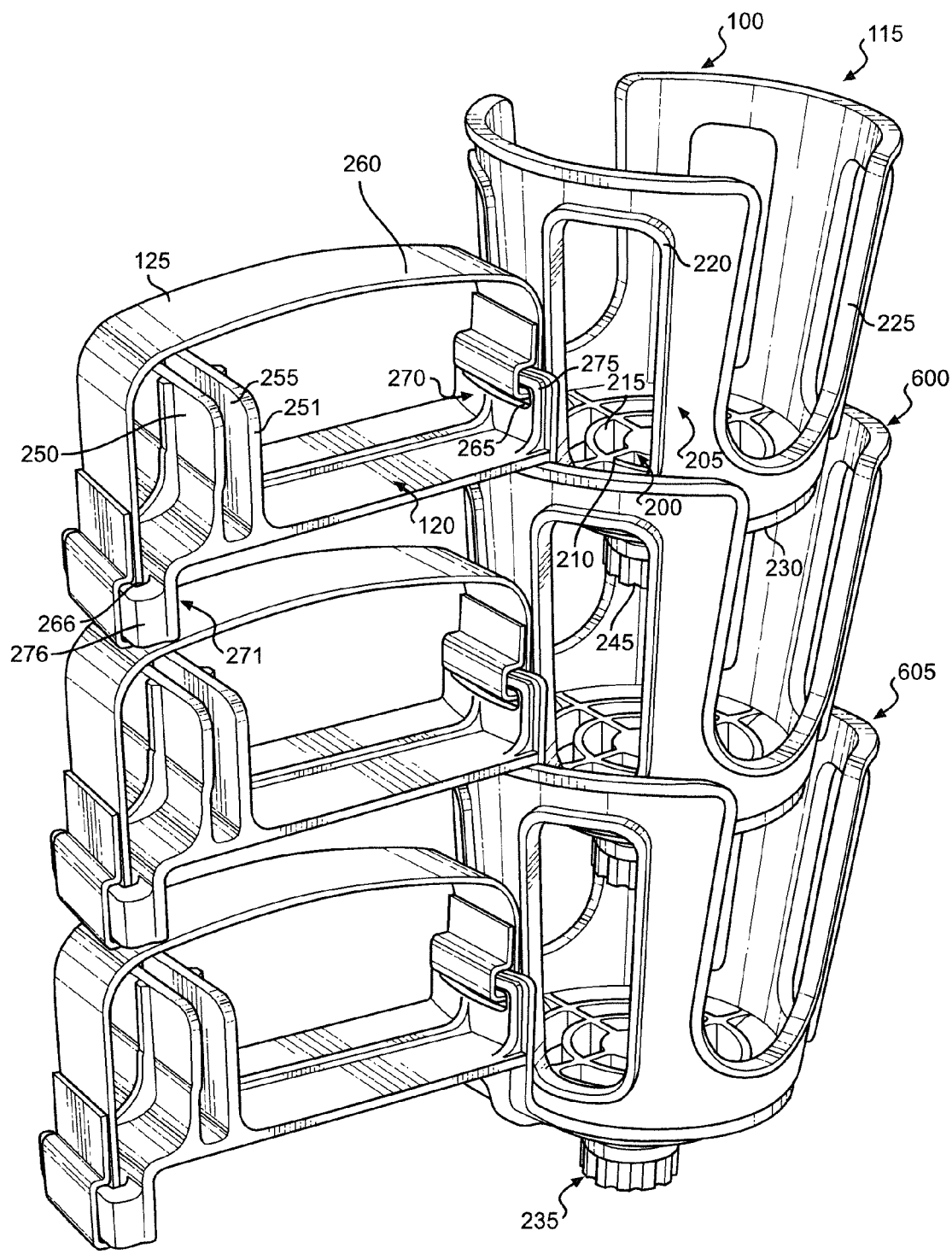
FIG. 6 is a perspective view of a plurality of stacked beverage holders in accordance with the present invention.

FIG. 6 illustrates an aspect of the invention wherein a plurality of beverage holders can be arranged in a stacked configuration. Specifically, beverage holder 100 is shown stacked on top of beverage holders 600 and 605, which are constructed in an identical manner to beverage holder 100. The shape of beverage holders 100, 600 and 605 allows them to be stacked with a cup, bottom wall and leveling mechanism of one beverage holder being received in a cup of the beverage holder below. For example, cup 115, bottom wall 230 and leveling mechanism 235 of beverage holder 100 are located, at least partially, in a cup of beverage holder 600. The ability to stack the beverage holders of the present invention is particularly beneficial during transport and when the beverage holders are on display. In addition, chairs to which the beverage holders are coupled can be stacked without the need to remove the beverage holders.

Based on the above, it should be readily apparent that the present invention provides a beverage holder that can be conveniently coupled to and decoupled from a variety of differently configured chairs. The beverage holder includes a leveling feature that ensures that a beverage placed in the beverage holder is vertically aligned regardless of the particular chair to which the beverage holder is coupled. Although described with reference to preferred embodiments, it should be readily understood that various changes or modifications could be made to the invention without departing from the spirit thereof. For instance, although slot 255 is shown to be fairly uniform in width from top to bottom (actually with a slightly larger width at a bottom section as perhaps best seen in FIG. 3), it should be noted that other configurations are possible. Actually, it is considered advantageous in connection with certain chair designs to employ a slot 255 which tapers from top to bottom, thereby enabling a vertical wall or leg 500 of arm 110 to be pinched and gripped by walls 250 and 251. That is, chairs and their armrests are made using different material thicknesses and dimensions. This tapered configuration better accommodates variations in armrest structure, e.g., both thick and thin armrests, while assuring the beverage holder is securely retained against lateral movement relative to the armrest to which it is attached. In general, the invention is only intended to be limited by the scope of the following claims.

I claim:

1. A beverage holder comprising:
    a cup configured to receive and support a beverage;
    an arm directly coupled to the cup, the arm including:
        a first vertical wall;
        a bottom wall on which the cup is supported, said bottom wall including an outside edge and an inside edge, with one of the outside edge and the inside edge being higher than another of the inside edge and the outside edge; and
        a second vertical wall, wherein the first and second vertical walls are located remote from the cup and are spaced to define a slot configured to receive a portion of an arm of a chair;
    a strap including:
        a first end fixed to the arm directly adjacent the cup; and
        a second end removably coupled to the arm; and
    a leveling mechanism configured to allow the cup to be tilted relative to both a vertical axis and the arm and selectively fixed in place, said leveling mechanism including a hole formed in the bottom wall and a shaft extending from the cup and into the hole, with a diameter of the hole being greater than a diameter of the shaft such that the shaft can be located in a plurality of different locations within the hole to vertically align the cup.

2. The beverage holder of claim 1, wherein:
    the outside edge is higher than the inside edge;
    the bottom wall slopes downward toward a center of the bottom wall; and
    the cup is in direct contact with the bottom wall.

3. The beverage holder of claim 1, wherein the diameter of the hole is between 2-4 times greater than the diameter of the shaft.

4. The beverage holder of claim 1, wherein:
    the shaft is threaded;
    the leveling mechanism includes a threaded knob directly coupled to the shaft;
    the leveling mechanism includes a plate located below the bottom wall; and
    the knob is in direct contact with the plate.

5. The beverage holder of claim 1, wherein:
    the arm further includes a first hole;
    the second end of the strap extends through the first hole; and
    the second end of the strap is removably coupled to itself.

6. The beverage holder of claim 5, wherein the second end of the strap includes hook-and-loop fasteners.

7. The beverage holder of claim 5, wherein:
    the arm further includes a second hole;
    the first end of the strap extends through the second hole; and
    the first end of the strap is fixed to itself.

8. A beverage holder comprising:
a cup configured to receive and support a beverage;
an arm directly coupled to the cup, said arm including a bottom wall on which the cup is supported, with said bottom wall sloping downward;
a strap configured to secure the beverage holder to a chair arm; and
a leveling mechanism configured to allow the cup to be tilted relative to both a vertical axis and the arm and selectively fixed in place such that a user can vertically align the cup, said leveling mechanism including structure removably securing the cup against the bottom wall of the arm.

9. The beverage holder of claim 8, wherein:
the bottom wall slopes downward toward a center of the bottom wall; and
the cup is in direct contact with the bottom wall.

10. The beverage holder of claim 9, wherein:
the bottom wall includes a hole, an outside edge and an inside edge;
the outside edge is higher than the inside edge;
the cup includes a shaft extending through the hole; and
a diameter of the hole is greater than a diameter of the shaft such that the shaft can be located in a plurality of different locations within the hole.

11. The beverage holder of claim 10, wherein the diameter of the hole is between 2-4 times greater than the diameter of the shaft.

12. The beverage holder of claim 10, wherein:
the shaft is threaded;
the leveling mechanism includes a threaded knob directly coupled to the shaft;
the leveling mechanism includes a plate located below the bottom wall; and
the knob is in direct contact with the plate.

13. A beverage holder comprising:
a cup configured to receive and support a beverage;
an arm directly coupled to the cup, the arm including:
a first vertical wall; and
a second vertical wall, wherein the first and second vertical walls are located remote from the cup and are spaced to define a slot configured to receive a portion of an arm of a chair; and
a strap including:
a first end fixed to the arm directly adjacent the cup; and
a second end removably coupled to the arm at a position beyond the first and second walls from the cup.

14. The beverage holder of claim 13, wherein:
the arm further includes a first hole;
the second end of the strap extends through the first hole; and
the second end of the strap is removably coupled to itself.

15. The beverage holder of claim 14, wherein the strap includes hook-and-loop fasteners.

16. The beverage holder of claim 14, wherein:
the arm further includes a second hole;
the first end of the strap extends through the second hole; and
the first end of the strap is fixed to itself.

17. A method of supporting a beverage, in a beverage holder having a cup to support the beverage, from an arm of a chair comprising:
inserting the arm of the chair in a receiving region established, at least in part, by an arm of the beverage holder;
wrapping a strap, having a first end fixed to the arm of the beverage holder, about the arm of the chair;
attaching a second end of the strap to the arm of the beverage holder at a location remote from the cup to secure the beverage holder to the arm of the chair; and
tilting the cup relative to the arm of the beverage holder by adjusting a leveling mechanism of the beverage holder.

18. The method of claim 17, wherein inserting the arm of the chair in the receiving region further includes positioning a portion of the arm in a slot defined between first and second upstanding walls of the arm of the beverage holder.

19. The method of claim 17, wherein tilting the cup relative to the arm of the beverage holder includes adjusting a leveling mechanism configured to allow the cup to assume a vertically aligned position and then selectively fixing the cup in the vertically aligned position with the leveling mechanism.

20. The beverage holder of claim 8, wherein the leveling mechanism includes a knob and a plate, with said knob being operable to press both the plate and the cup against the bottom wall of the arm in fixing the cup in place.

* * * * *